United States Patent [19]

Derian et al.

[11] Patent Number: 5,499,745

[45] Date of Patent: Mar. 19, 1996

[54] APPARATUS FOR MIXING AND DISPENSING TWO CHEMICALLY REACTIVE MATERIALS

[75] Inventors: Gary A. Derian, Westlake; Herman E. Turner, Jr., Welington; Michael W. Fleming, Lorain, all of Ohio

[73] Assignee: Nordson Corporation, Westlake, Ohio

[21] Appl. No.: 198,974

[22] Filed: Feb. 18, 1994

[51] Int. Cl.⁶ ........................ B25J 19/00
[52] U.S. Cl. ........................ 222/136; 222/145.6
[58] Field of Search .................... 222/129.2, 136, 222/137, 145, 145.1, 145.6

[56] References Cited

U.S. PATENT DOCUMENTS

| | | |
|---|---|---|
| 3,506,025 | 4/1970 | Benjey . |
| 4,014,463 | 3/1977 | Hermann .................... 222/145 |
| 4,350,803 | 9/1982 | Penn ........................ 528/10 |
| 4,523,696 | 6/1985 | Commette et al. ............. 222/135 |
| 4,666,732 | 5/1987 | Schucker .................... 427/8 |
| 4,684,332 | 8/1987 | Hartley et al. .............. 222/129.2 |
| 4,779,761 | 10/1988 | Rudick et al. ............... 222/1 |
| 4,852,773 | 8/1989 | Standlick et al. ............ 222/504 |
| 4,901,888 | 2/1990 | Standlick ................... 222/145 |
| 4,922,852 | 5/1990 | Price ....................... 118/683 |

(List continued on next page.)

FOREIGN PATENT DOCUMENTS

| | | |
|---|---|---|
| 1217745 | 2/1987 | Canada . |
| 0098719 | 1/1984 | European Pat. Off. . |
| 0137250 | 8/1984 | European Pat. Off. . |
| 0478944 | 5/1994 | European Pat. Off. . |
| 2385446 | 10/1978 | France . |
| 2536471 | 5/1984 | France . |
| 4031649 | 3/1994 | Germany . |
| 1187590 | 4/1970 | United Kingdom . |
| 1581536 | 12/1980 | United Kingdom . |

OTHER PUBLICATIONS

*Nordson®Pro–Flo™System*, publication of Nordson Corporation, Amherst, OH, Dec. 1989.

*Dispensing and Application Equipment for Adhesives and Sealants*, James E. DeVries, Nordson Corporation, Amherst, OH, Reprinted from Engineered Materials Handbook®, vol. 3: Adhesives and Sealants, ASM International, Materials Park, OH 1991 (no month date).

*Twinmixer™II Dispense Valve*, publication of Liquid Control Corp., North Canton, OH (no date).

*Posiload®*, pp. 2–3 (no date).

*Twinflow Mini II*, Technical Data Sheet of Liquid Control Corp., North Canton, OH, May, 1987.

*Motionless Tube Mixing Assembly With Over–under Block*, Form No. PS–101, Liquid Control Corp., North Canton, OH 12–82.

*Oil–Rite®Injector Pump System Featuring PurgeX, Style DG*, Oil–Rite Corporation, Manitowoc, WI, 1989, pp. 1–6 (no month date).

*Material Flow Control Smooths Sealant Dispensing*, Robotics World, publication of Communication Channels, Inc., May/Jun. 1989.

*Robotic Dispensing of Cold Sealants and Adhesives New Developments*, Herb Turner Nordson Corporation, Amherst, OH 1988 (no month date).

*Automation and Robotics for Adhesives and Sealants Use*, Herb Turner, Nordson Corporation, Amherst, OH, Reprinted from Engineered Materials Handbook™, vol. 3: Adhesives and Sealants, ASM International, Materials Park, OH 1991 (no month date).

*Primary Examiner*—Shrive Beck
*Assistant Examiner*—Katherine A. Bareford
*Attorney, Agent, or Firm*—Raymond J. Slattery, III

[57] ABSTRACT

A metering unit (12) is attached to the robot (10) for providing two polymeric materials to a dispenser/mixer module (14) attached to the end of the robot arm (16). The metering unit includes piston (44) located concentrically about the shaft (42) of a dual actuating piston assembly (36) for providing the two polymeric materials in a fixed ratio. A variable rate dispenser (62) is provided for compensating for changes in robot velocity and/or viscosity changes.

18 Claims, 5 Drawing Sheets

U.S. PATENT DOCUMENTS

| | | | |
|---|---|---|---|
| 4,966,306 | 10/1990 | Credle, Jr. et al. | 222/1 |
| 4,988,015 | 1/1991 | Price | 222/1 |
| 5,005,765 | 4/1991 | Kistner | 239/135 |
| 5,052,591 | 10/1991 | Divall et al. | 222/135 |
| 5,054,650 | 10/1991 | Price | 222/1 |
| 5,065,695 | 11/1991 | Baron et al. | 118/688 |
| 5,071,038 | 12/1991 | Credle, Jr. | 222/137 |
| 5,092,492 | 3/1992 | Centea | 222/137 |
| 5,121,855 | 6/1992 | Credle, Jr. | 222/136 |
| 5,263,608 | 11/1993 | Kiernan et al. | 222/1 |
| 5,271,521 | 12/1993 | Noss et al. | 222/135 |

APPARATUS FOR MIXING AND DISPENSING TWO CHEMICALLY REACTIVE MATERIALS

FIELD OF INVENTION

This invention relates to two-component mixing and dispensing systems and, more particularly, to such systems for mixing and dispensing two different polymeric materials which react chemically with one another when combined. In particular, this invention is especially suited to the mixing and dispensing of two-component adhesives used in the assembly of products, such as for example, the assembly and manufacture of vehicles.

BACKGROUND OF THE INVENTION

Two-component polymeric materials, such as reactive adhesives, paint, gasket materials, and caulking materials comprise two separate components which when intermixed begin to react chemically with one another. For example, epoxies are a two-component material which includes a first polymeric material, such as a resin, and a second material, such as a hardener. When intermixing the two different components together, a predetermined ratio must be maintained so that the operating performance of the resulting mixture of adhesive is maintained. Changing the ratio of the mix of components, such as by adding too much of one component may undesirably alter the characteristics of the combined mixture. It is therefore important that the ratio of the components of the two-component mixing and dispensing systems be exactly maintained. This ratio is especially difficult to maintain when the resultant mixture of materials is dispensed in an intermittent operation, i.e., which is repeatedly turned on and off. In such applications, loss of ratio control may occur shortly after the dispensing valve is opened, during which time a transient imbalance phenomenon may occur. This transient imbalance may be caused by either hydraulic or mechanical elasticity of the system and the changing hydraulic pressures associated with cycling the dispenser.

In addition to the transient imbalance phenomenon described above, a loss of precise control of the flow rate of the mixture may occur as a result of changes in the flow characteristics of one or both of the components due to changes in the viscosity over time. For example, if the material is supplied from a drum, the viscosity of the fluid can vary with changes in temperature as the drum sits in a warm production area after having been moved from a cold warehouse. Viscosity may also vary from one batch of material to the next, as well as from the top of a given drum to the bottom of the same drum.

Furthermore, when dispensing viscous fluids, it is often necessary to apply the material to the surface of a workpiece in a bead containing a desired amount of material per unit length. In high production processes or where the bead of material must be positioned with accuracy, robot arms are often used to apply the material by rapidly guiding a dispensing nozzle in a programmed pattern over the surface of a workpiece. Depending on the application, the fluid being dispensed may either be projected some distance from the nozzle in a high velocity stream or extruded from the nozzle at lower velocity with the nozzle located closer to the workpiece. In either case, the amount of material applied per unit of linear distance along the bead will vary according to both the flow rate of material discharged from the dispensing nozzle and the speed of the nozzle with respect to the workpiece.

For example, in the automotive industry, it is necessary to apply a uniformed bead of material around the periphery of a panel before it is bonded to the frame of the automobile. Along straight portions of the pattern, a robot arm can move the nozzle quickly. However, where the desired bead pattern changes direction abruptly, such as around corners, the robot arm must be slowed down to achieve a required bead positioning accuracy. It can be appreciated that if the flow rate of the dispensed fluid material is held fixed, the amount of material in the applied bead will increase as the velocity of the robot arm decreases to negotiate changes in direction and will decrease as the robot arm is accelerated. Therefore, the flow rate of the material must vary with the speed of the robot arm. However, when dispensing non-newtonian fluids, the overall instantaneous viscosity of the fluid varies with shear rate in a non-linear fashion. Therefore, the shear induced by the geometry of a nozzle to the mixture being dispensed causes the pressure required to dispense the mixture to vary in a non-linear fashion with regard to the speed associated with the robot arm.

Another problem associated with two-component dispensing is that when the two materials forming the two-component mixture are brought together, they begin to cure. This cured material may tend to collect on surfaces of a mixer and/or the dispenser, particularly when such components are dispensed intermittently. The longer these materials cure, the greater the probability exists that a restriction of the flow of the materials through the mixture may occur or that a complete blockage may occur. It is therefore desirous to mix the two components together and to dispense them immediately. However, the dispenser associated with the respective robot arm, must be as compact and light weight as possible.

A dispenser mounted at the end of the robot arm cannot be too heavy otherwise it will overload the robot arm. Furthermore, a heavier mass carried at the end of the robot arm increases the difficulty of the robot arm to accelerate and decelerate in applying the bead of adhesive to various parts of a workpiece. On the other hand, remotely mounting the dispenser from the robot may further increase the transient imbalances which occur due to the elasticity of the system.

SUMMARY OF THE INVENTION

It is therefore an object of the invention to provide a dispensing system which is relatively compact and light weight as to be well suited for use with robots programmed to define a desired pattern according to which a bead of material is to be applied to the workpiece.

It is also an object of the invention to provide a two-component dispensing system which is capable of precisely controlling the amount of material applied to a workpiece per unit of linear distance along a bead pattern despite rapid changes in the relative speed between the robot and the workpiece. According to one embodiment, this may include adjusting the flow rate of one of the materials to compensate the mixture for intrinsic viscosity and/or shear induced viscosity changes.

It is an object of the invention, according to one embodiment, to provide a multiple component dispensing system suitable for use in conjunction with a robot and wherein the metering unit is powered by the fluid pressure of one of the components. An advantage of such a system is that no additional power units, pumps, etc., are required.

It is also an object of the invention, according to one embodiment, to provide a two component dispensing system which is suitable for intermittent operations, thereby reducing or eliminating transient imbalances that may occur in such operations.

It is also an object of the invention to provide a two-component dispensing system which maintains the ratio of the materials dispensed throughout a dispensing cycle. A feature, according to one embodiment, is that the dispensing of the components is coupled relative to one another and that by controlling the flow of one component automatically controls and compensates the other.

These and other objects may be accomplished by an apparatus for dispensing viscous fluid materials comprising: first, second, and third fluid chambers, the third chamber disposed between the first and second chambers; first, second and third piston means disposed respectively within the first, second and third chambers; a first piston rod connected to the first and second piston means and mounted for reciprocal movement; a means, connected to the third chamber, and adapted for cooperative movement with the first piston means; an inlet means, carried by the first chamber and adapted for coupling to a source of a first pressurized material; an inlet means, carried by the third chamber and adapted for coupling to a source of a second pressurized fluid material; a first fluid passageway for coupling the first and third chambers together; the second and third chambers each carrying a discharge outlet adapted for coupling to a dispensing means; means for selectively preventing the flow of material to the second chamber; wherein the first, second and third pistons are capable of movement to a first position in response to the fluid pressure of the first and second materials on the second and third piston means respectively; and wherein the first, second and third pistons are capable of movement to a second position in response to fluid pressure of the first material on the first piston means for dispensing the fluid material from the second and third chambers.

These and other objects may also be accomplished by a two-component mixing and dispensing system for mixing and dispensing two different liquid polymeric materials which react chemically with one another when combined, said system comprising: a means, coupled to a first and second source of fluid material, for providing a supply of first and said second materials in a fixed ratio; a dispenser, for mixing the first and second materials together to form a mixture, and for dispensing the mixture onto a substrate; a means for controlling the flow rate of the mixture dispensed from said dispenser by varying the flow rate of one of the materials without varying the ratio of the first and second materials of the mixture in response to a control signal.

This object may be further accomplished by: a method of dispensing two different liquid reactive polymeric materials comprising the steps of: supplying a first and second liquid material to a ratio control means; supplying the first material at a fixed ratio to the second material to a dispenser mounted on a robot arm; combining the first and second liquid materials to produce a mixture thereof; dispensing the mixture from an outlet of the dispenser, onto a substrate, at a flow rate; and controlling the flow rate of the first material to the dispenser as a function of the relative speed of the discharge outlet to the substrate.

DESCRIPTION OF THE DRAWINGS

The following is a brief description of the drawings in which like parts may bear like reference numerals and in which.

DETAILED DESCRIPTION OF THE INVENTION

Figure 1:
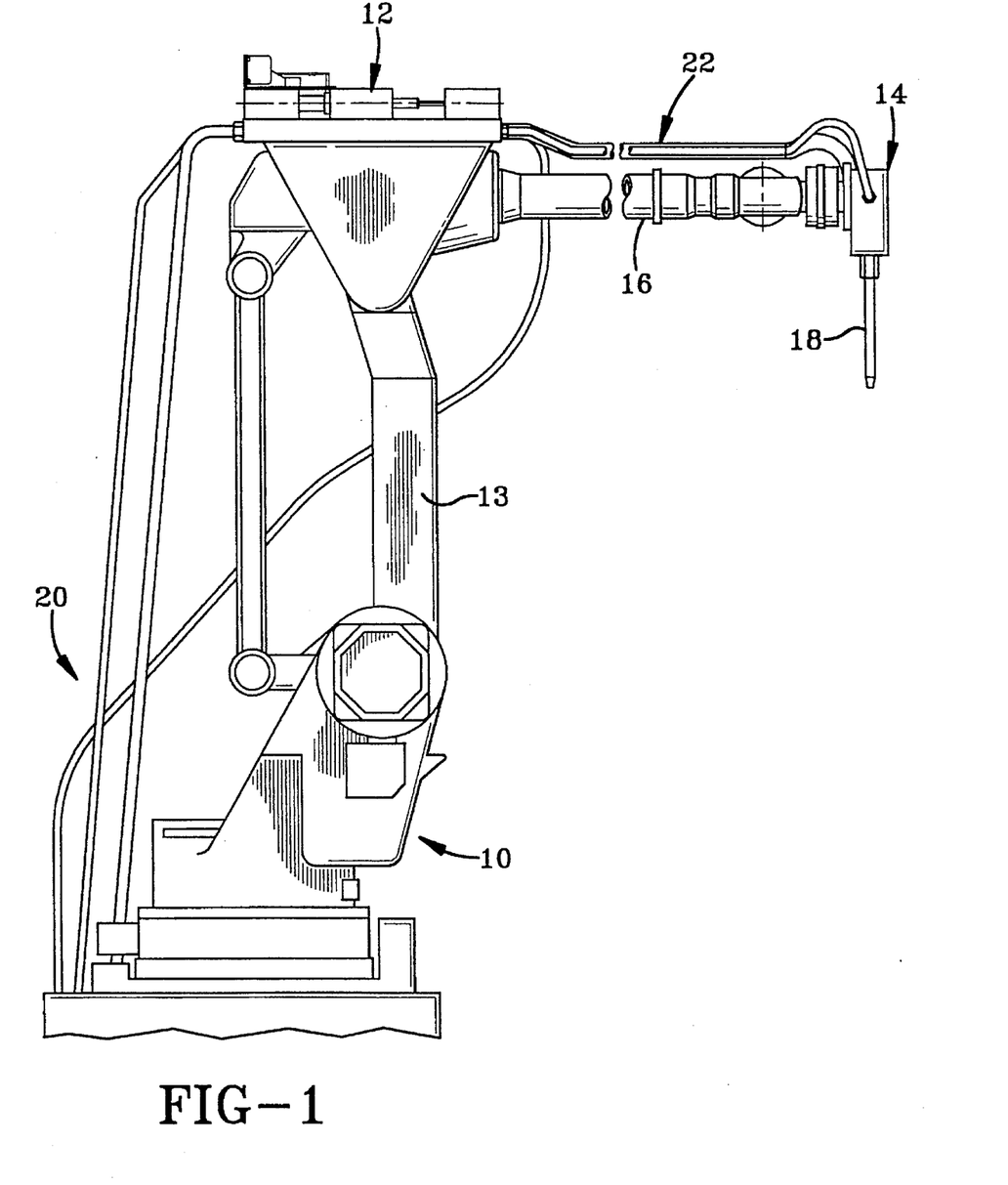
FIG. 1 is an elevational view of the dispensing system in accordance with one embodiment of the invention used in conjunction with an industrial robot.

Now, with reference to FIG. 1, there is illustrated an elevational view of a dispensing system according to the preferred embodiment of this invention, utilized in conjunction with an industrial robot shown generally as reference numeral 10. The dispensing system includes a metering unit 12 attached to the stanchion portion 13 of the robot and a dispensing/mixing module 14 attached to the end of the arm 16 of the robot 10. Separating the dispensing/mixing module 14 from the metering unit 12 allows for the majority of the weight to be located in the vertical portion of the robot while at the same time minimizing the amount of weight that must be carried at the end of the robot arm 16. Keeping the amount of weight carried by the arm 16 to a minimum reduces the torque load on the robot while also reducing the force, as well as the time necessary to accelerate/decelerate the robot arm. Also, mounting the metering unit 12 on the robot as opposed to a remote location minimizes the distance between the metering unit and the dispensing/mixing module, thereby reducing the effects of transient imbalances associated with the capacitance of the dispensing system.

The metering unit is supplied by a number of hoses and cables, shown generally as reference numeral 20, for connecting the metering unit to the respective source of fluid material for the "A" and "B" components, for providing a source of air, and for electrically coupling the metering unit to an electrical controller.

The metering unit 12 is in turn coupled to the dispensing/mixing module 14 by a plurality of hoses, shown generally as reference numeral 22. These hoses include a hose for each of the "A" and "B" components as well as a pneumatic hose for actuation of the dispensing/mixing module.

With reference to FIGS. 2–5, the metering unit 12 includes an "A" fill chamber 30, an "A" dispense chamber 32 and a "B" chamber 34. A dual actuating piston assembly 36 includes a first piston 38 located within the "A" fill chamber 30 as well as a second piston 40 located in the "A" dispense chamber 32. The surface area of the first piston 38 is less than the surface area of the second piston 40. Each piston 38, 40 preferably extends from the respective chamber. Located between the first and second pistons 38, 40 is a rod or shaft 42. Preferably rod 42 is a push rod such that it is not attached to either piston 38 or 40 but rather pushes on them as will be discussed further below. Pistons 38, 40 and shaft 42 are not attached to one another in order to help facilitate the assembly/disassembly of the unit. Alternatively however, the shaft could be attached to one or both of the pistons. A third piston 44 is located within the "B" chamber 34. Piston 44 is concentric with and capable of slidable movement on, shaft 42. Piston 44 may be a stepped shaft, wherein the larger diameter portion extends from the fluid chamber towards the fill chamber 30. Each of the pistons 38, 40, and 44 do not necessarily make a tight fit with the respective chamber 30, 32, and 34. In other words, it is preferred that the diameter of each piston is less than the diameter of the chamber. Spacing the piston heads away from the walls of the chamber allows for some material to flow past, thereby allowing the inlets and outlets of each chamber to be at opposite ends, such as inlet 32a and outlet 32b of chamber 32. The "B" component chamber has a pair of seals 45, one at either end of the chamber which allow piston 44 to extend from the chamber but which prevent the flow of fluid therefrom. These seals may be, for example, chevron packings. In like manner chambers 30 and 32 are also equipped with seals to allow the pistons 38 and 40 to pass therethrough.

Figure 2:
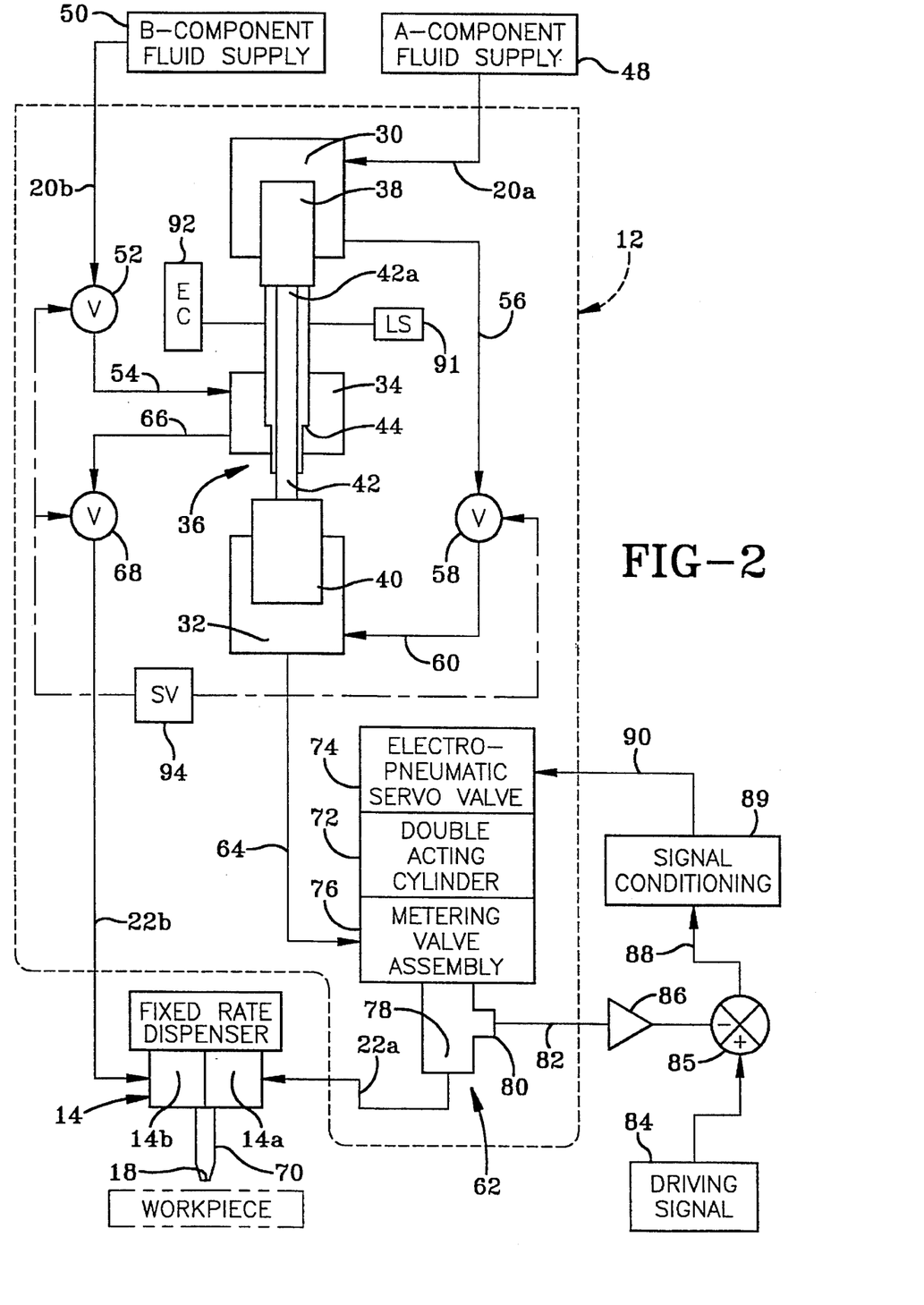
FIG. 2 is a schematic block diagram illustrating a preferred embodiment of the system for dispensing a two-component fluid material according to one aspect of the invention.
Figure 3:
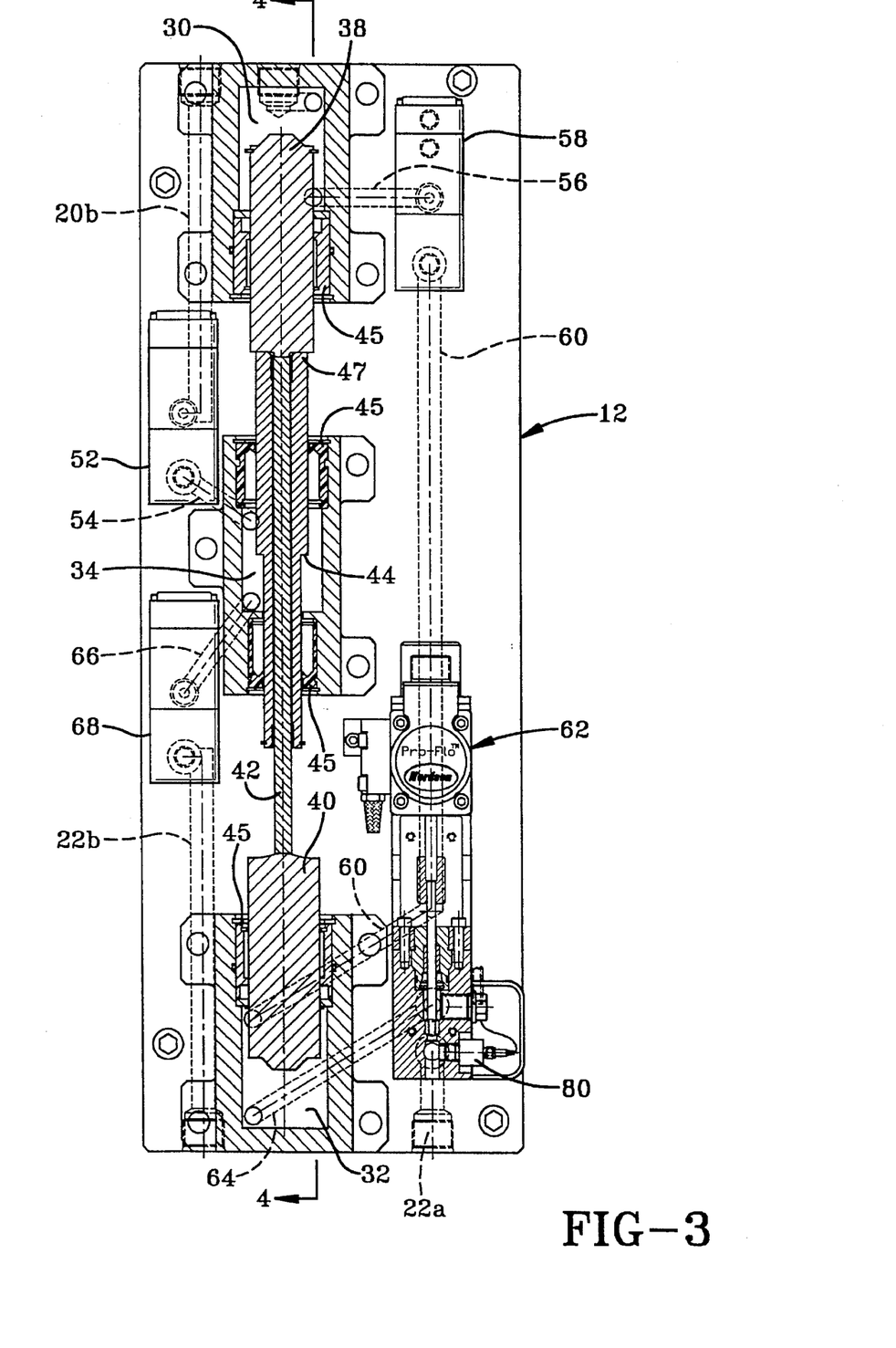
FIG. 3 is a plan view of the preferred metering unit and partial cross section and in which portions have been removed for clarity.
Figure 4:
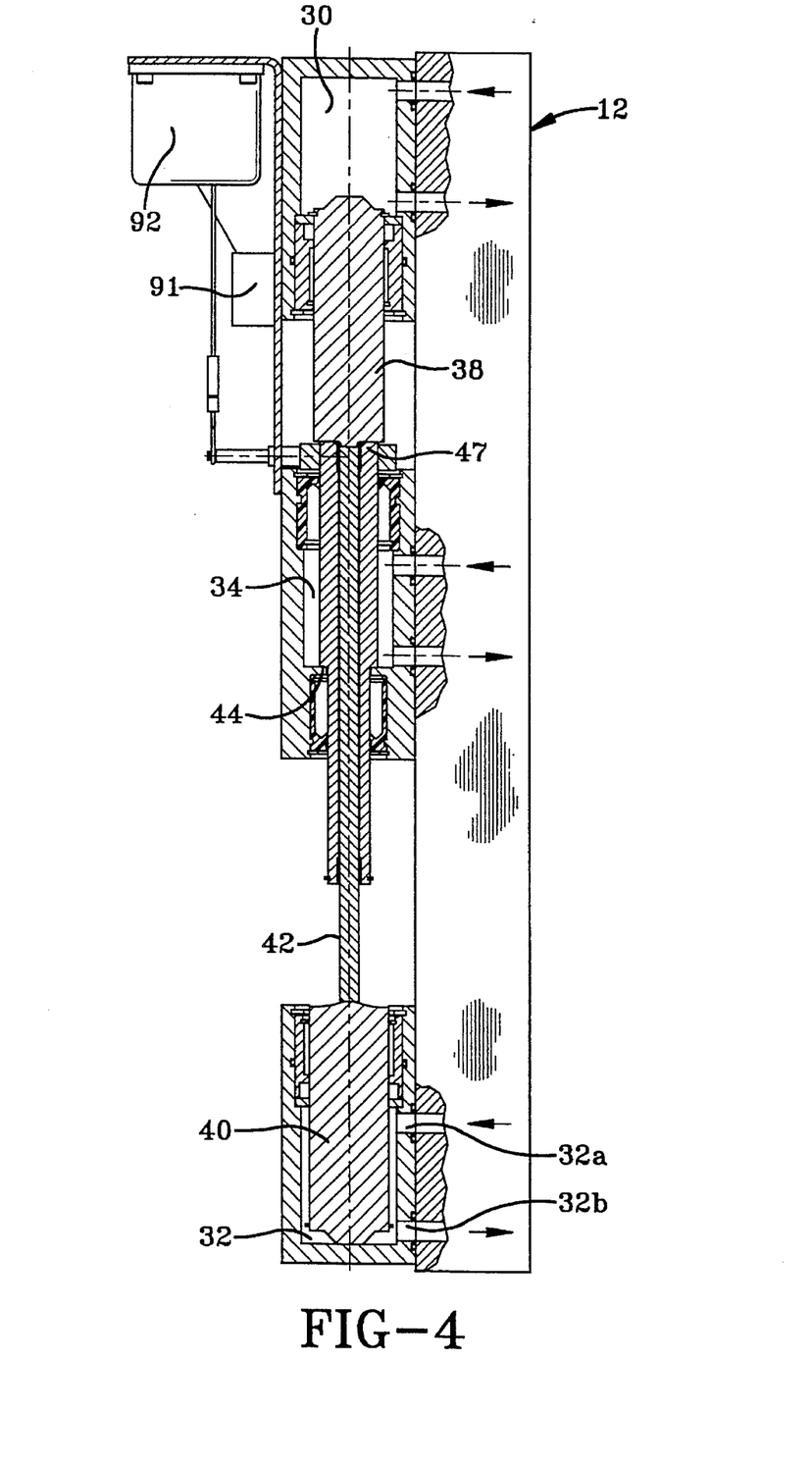
FIG. 4 is a portion of the metering unit of FIG. 3 taken substantially along 4—4, but after the dispensing of the "A" and "B" component materials, i.e., the system needs to be refilled.

The "A" component fluid supply 48 supplies the "A" component material via line 20a to the "A" component fill chamber 30. Likewise, fluid supply 50 provides a source of "B" material to the "B" chamber 34 via line 20b, valve 52 and line 54.

The "A" fill chamber 30 is coupled to the "A" dispense chamber 32 via line 56, valve 58, and line 60. The output of the "A" dispense chamber 32 is in turn coupled to a variable rate dispenser 62 via line 64. The variable rate dispenser 62 is in turn coupled to the dispensing/mixing module 14 via line 22a while the output of the "B" chamber 34 is coupled to the dispensing/mixing module via line 66, valve 68, and line 22b.

Figure 5:
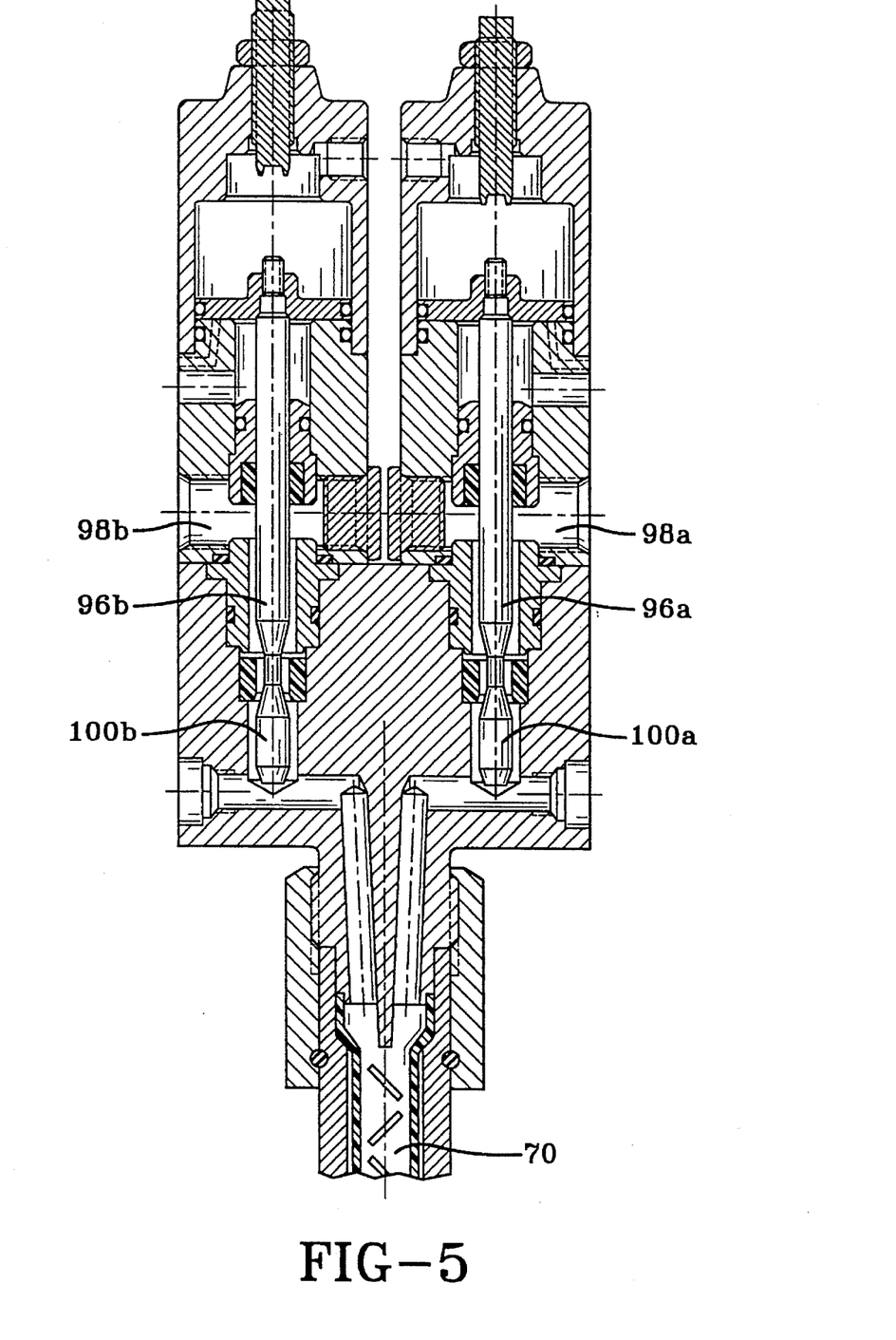
FIG. 5 is a cross sectional view of the dispenser/mixer.

The dispensing/mixing module 14 includes an on/off valve 14a for starting and stopping the flow of fluid material of the "A" component as well as an on/off valve 14b for starting and stopping the flow of fluid material of the "B" component. While on/off valves 14a and 14b may be interconnected for simultaneous operation, it is preferred that they are capable of independent operation from one another in order to facilitate for the detection of leaks. Module 14 further includes a conventional static mixer 70 for combining and mixing the "A" and "B" component materials together prior to dispensing from nozzle 18.

Each on/off valve 14a, 14b may include a plunger 96a, 96b, that when pneumatically actuated (open) allows for the flow of the respective "A or B" component material from an inlet 98a, 98b to the static mixer 70 and prevents this flow when pneumatically de-actuated (closed). Other types of on/off valves may also be used, such as pneumatic/spring activated or electrical valves. Each plunger 96a, 96b may also include a plug portion 100a, 100b which not only prevent the flow of fluid in the closed position, but also provides a means for drawing fluid upwardly to substantially reduce the leakage or drooling of material from the nozzle 18.

The variable rate dispenser 62 compensates for changes in the robot velocity (the apparent velocity between the dispensing nozzle 18 and the work piece) by proportionally adjusting the material flow at the nozzle 18 in order to maintain uniform material deposition. Dispenser 62, may include an adjustable discharge orifice providing for instantaneous flow adjustment based upon signals supplied by the robot controller. The dispenser 62 may also include a servo actuator, which may consist of any of the number of types of compact, light weight linear actuators offering rapid response, but preferably includes a double acting air cylinder 72 having a piston rod whose degree of extension is controlled by an electrically actuated pneumatic servo valve 74 mounted atop the air cylinder 72. Dispenser 62 also includes a metering valve assembly which includes a needle valve located close to the discharge outlet 78 and includes a valve stem having a generally conical end connected to the piston rod for the double acting cylinder so that the position of its conical end relative to a valve seat and hence, a flow rate of fluid discharged from the discharge outlet is controlled in accordance with electrical input of the electro-pneumatic servo valve 74. A transducer 80 located just downstream of a needle valve generates an electrical signal 82 correlated to the rate of flow of fluid discharge outlet. A signal 82 generated by the transducer 80 is preferably used as a feedback signal to control the rate of flow of fluid dispensed from the discharge outlet in accordance with a desired driving signal 84. The signal 82 may be first amplified by amplifier 86 and then combined with the driving signal 84 to produce a signal 88, which in turn may be further modified, such as through amplification and the use of a dither generator, to produce a signal 90 which is supplied to the coils of the electro-pneumatic servo valve 74 to drive the piston of the air cylinder 72 to either increase the flow of fluid from the discharge outlet or to decrease the flow of fluid from the discharge outlet.

The description of the variable rate dispenser 62 is described further in U.S. Pat. Nos. 5,054,650; 5,065,695; 4,922,852; and 4,988,015. The disclosure of each is hereby incorporated herein. In the preferred embodiment, the variable rate dispenser 62 is the commercially available Nordson® Pro-Flo® dispenser manufactured by Nordson Corporation, of Amherst, Ohio.

The operation of the system will now be discussed. In order to fill or charge the system, valves 52 and 58 are open while valve 68 and the variable rate dispenser 62 are closed. The "A" component material flows through line 20a into the "A" chamber 30 and through lines 56 and 60 to the "A" dispense chamber 32, while the "B" component material flows through lines 20b and 54 to the "B" chamber 34. As the "A" dispense chamber 32 fills, pressure is exerted onto the piston head 40. Similarly, as the "B" material fills chamber 32, a force is exerted onto the piston head 44. The force applied to piston 44 will cause it to move towards chamber 30 until it is in contact with piston head 38. Similarly, the force applied to piston head 40 will cause the end 42a of shaft 42 to be in contact with piston 38. The force applied to piston heads 40 and 44 is in turn transferred to piston head 38. The combined force exerted on piston heads 40 and 44 overcomes the pressure exerted on piston 38 by the "A" material and causes the piston assembly 36 to move upward (as depicted in FIG. 2). This movement will continue until limit switch 91 is activated. The activation of limit switch 91 indicates that both the "A" dispense chamber 32 and the "B" chamber 34 are filled. Once this occurs, valves 52 and 58 are closed and the system is ready to dispense. Limit switch 91 is preferably activated by the movement of the stepped shaft of piston 44. Piston heads 38, 40 and 44 must be sized such that piston head 44 alone cannot drive piston head 38 to cause the limit switch 91 to indicate a fully retracted piston, otherwise incomplete filing of the chambers can occur. This will in turn affect the ratio of the mixture dispensed from the dispensing/mixing module. While it is preferred that both pistons 40 or 44 are required to drive piston 38 to the fill position, it is possible to cause piston 38 to be driven by piston 40 only, provided that the limit switch is still actuated by the movement of piston 44.

Upon a signal to begin dispensing, valve 68 and the variable rate dispenser 62 open. Likewise, the valves in the dispensing/mixing module 14 also open. In response to the pressure applied to the "A" fill chamber 30 from the "A" fluid supply 48, piston head 38 is driven toward the "A" dispense chamber 32. This movement drives piston 44 and shaft 42 which in turn drives piston 40. As piston 40 is driven downwardly, "A" component material is transferred from the "A" dispense chamber 32 to the variable rate dispenser 62 via line 64. The flow rate of the "A" component material being supplied to the dispensing/mixing module 14 is controlled by the variable rate dispenser 62 in conjunction with the tool speed signal of the robot. The flow rate of the "B" component material to the dispensing/mixing module 14 is controlled directly by the flow rate of the "A" component material being discharged via line 22a because piston 44 of the "B" component material does not move independently of the movement of the piston 40, but rather is driven by the force of piston 38 on the end 47 of piston 44. In other words, the volumetric ratio of the "A" and "B" component materials is maintained constant because the "B" component material will follow directly with changes in the rate of dispensing associated with the "A" component material. Not only will the mixed ratio of the "A" and "B" component materials be maintained throughout the dispensing cycle, but the amount of fluid being dispensed from nozzle 18 is able to be varied in order to maintain a uniform bead of material throughout the dispensing cycle.

An encoder 92 may be attached to the piston 44 in order to monitor the amount of material dispensed during a dispensing cycle and/or to generate a signal to refill or recharge chamber 30, 32 and 34 to begin a new cycle. The signal generated by the encoder corresponds to the actual amount of material dispensed during a cycle. This signal may in turn be used to modify the driving signal 90 in order to maintain a desired amount of material dispensed during a cycle and thereby compensate for temperature and other factors which may affect the amount of material dispensed over time as described in U.S. Pat. No. 5,054,650.

The dispensing system may periodically check for system leaks. This may be accomplished, for example, by filling both the "A" dispense chamber 32 and the "B" chamber 34 as described above. Once the system is charged, the "B" valves 52 and 68 are closed. Then, the "A" component valve 58 is closed while the variable rate dispenser 62 and the "A" valve 14a of the dispenser/mixer is opened. As long as the system integrity of the "B" portion is maintained, the piston assembly 36 will not begin to dispense because piston 44 will not be able to be displaced. The movement of the piston assembly may be monitored such as by utilizing the output of the encoder 92. If a signal, such as pulses or counts, is generated by the encoder 92, then this would indicate that a leak is present in the "B" component portion, such as in lines 54 or 66 or in valve 68. In that the "B" component material might be somewhat compressible under this testing procedure, the encoder could move slightly. Therefore, this checking method may have to require that a certain minimum number of counts must be exceeded before an indication that a leak has occurred. The "B" portion of the dispensing system may be further checked by opening valve 68 while maintaining the "B" valve 14b portion of the dispenser/mixer 14 in the closed position. Again the output of the encoder 92 may be monitored to determine if a leak is present. If no leak was determined by the first test but a leak is indicated by the second test, then a leak is occurring either in hose 22b or the "B" valve 14b of the dispenser/mixer 14. On the other hand, if a leak occurred during the first test and a leak was not indicated by the second test, then valve 68 is leaking. A leak indicated on both tests would indicate that either lines 54 or 66 were leaking.

The "A" component portion of the dispensing system may be checked by closing the "B" component valve 52 as well as the "A" component valve 58 once the system has been fully charged. Then the "B" component valve 68, as well as the "B" valve 14b of the dispenser/mixer 14 are opened. The variable rate dispenser 62 closed and with the "A" valve 14a of the dispenser/mixer 14 opened, the piston assembly 36 will not move unless a leak occurs in lines 60 and 64 or through the variable rate dispenser 62. The "A" dispensing portion may further be checked by closing valve 14a of the dispenser/mixer 14 and then opening the variable rate dispenser 62. If a leak was not detected previously, then if a leak is detected here, it would indicate the present of a leak in line 22a or through the valve 14a.

Plugging of the dispensing system may also be monitored by monitoring the time required to recharge the system. For example, the volume of fluid dispensed for a particular workpiece should remain constant. Therefore, the amount of material necessary to recharge the system from one workpiece to the next workpiece, should also remain constant. By maintaining a constant pressure of "A" and "B" material, the fill times then should also be constant. If however, the fill time necessary to recharge the system increases, this would be an indication that a portion of the system has begun to become plugged or fowled. Therefore, the interval between the generation of the signal to fill the system and a signal generated by the activation of the limit switch 90 could be compared to a reference and if this reference is exceeded a signal, such as an alarm signal, may be generated to indicate that the system is experiencing difficulties in filling, such as caused by partial plugging of hoses, etc.

The valves 52, 60, and 68 may be pneumatically actuated valves suitable for dispensing viscous fluids, such as the Nordson® H20 automatic hot melt gun manufactured by Nordson Corporation, Amherst, Ohio. The control of the air pressure to these valves may be controlled via solenoid valve 94.

While representative embodiments and details have been shown for the purpose of illustrating the invention, it will be apparent to those skilled in the art that various changes and/or modifications may be made therein without departing from the scope of the invention.

It is claimed:

1. An apparatus for mixing and dispensing specified amounts of mixed first and second viscous fluid materials comprising:

a multi-chamber assembly having first, second, and third axially aligned spaced apart chambers, the third chamber disposed between the first and second chambers and including first, second, and third piston means disposed respectively within the first, second and third chambers;

a piston rod mounted for reciprocal movement between the first and second piston means;

an inlet means, carried by the first chamber and adapted for coupling to a source of a pressurized first fluid material;

an inlet means, carried by the third chamber and adapted for coupling to a source of a pressurized second fluid material;

a first fluid passageway for coupling the first and second chambers together to permit a flow of the first fluid material from the first chamber to the second chamber;

the second and third chambers each carrying a discharge outlet;

a mixing and dispensing means coupled to the outlets of both the second and third chambers to receive both first and second fluid material from the respective second and third chambers, to intermix the first and second fluid materials and to dispense the resultant mixture thereof;

means for selectively permitting or preventing the flow of the first material from the first chamber to the second chamber;

wherein the first, second and third pistons are capable of movement to a first position in response to a fluid pressure of the first and second fluid materials on the second and third piston means respectively for filling the second and third chambers with first and second fluid materials respectively; and wherein the first, second and third pistons are capable of movement to a second position in response to fluid pressure of the first fluid material on the first piston means to cause simultaneous dispensing of the first fluid material from the second chamber and the second fluid respective discharge outlet of each chamber to the mixing and material from the third chamber through the dispensing means.

2. The apparatus of claim 1 further comprising a means, responsive to a signal, for regulating the flow rate of the fluid materials.

3. The apparatus of claim 1 further comprising a means for regulating the flow rate of the fluid materials and for compensating for viscosity changes in the fluid materials.

4. The apparatus of claim 1 further comprising a means, coupled to the discharge outlet of the second chamber and coupled to the mixing and dispensing means, for selectively preventing the flow of the first material therethrough and for varying the flow rate of the first material therethrough.

5. The apparatus of claim 1 wherein:

the piston rod extends through the third fluid chamber; and the third piston means includes a piston head and a shaft, each of which is concentric with and adapted for reciprocal motion along the piston rod, and said shaft extending from the third fluid chamber, and capable of being juxtaposed with the first piston means.

6. The apparatus of claim 5 wherein the piston rod is attached to the first and second piston means.

7. The apparatus of claim 5 wherein a piston head of each piston means has a smaller diameter than the respective fluid chamber, to allow fluid to pass along an axis of movement of a piston between the first and second positions.

8. The apparatus of claim 5 wherein the first and second piston means each include a piston head extending from the respective fluid chamber;

the piston rod extends through the third fluid chamber;

the third piston means includes a stepped shaft disposed about, and capable of reciprocal movement along the piston rod, said stepped shaft extending from the third fluid chamber and capable of being juxtaposed to a end of the first piston means; and further comprising a means for regulating the flow of the fluid materials and for compensating for changes in viscosity.

9. A two-component mixing and dispensing system for mixing and dispensing two different liquid polymeric materials which react chemically with one another when combined, said system comprising:

the multi-chamber assembly of claims, coupled to a first and second source of fluid material, for providing a supply of first and said second materials in a fixed ratio;

a dispenser, for mixing the first and second materials together to form a mixture, and for dispensing the mixture onto a substrate;

a means for controlling the flow rate of the mixture dispensed from said dispenser by varying the flow rate of one of the materials without varying the ratio of the first and second materials of the mixture.

10. The system of claim 9 wherein the means for controlling the flow rate of the dispensed mixture comprises:

a means for maintaining the flow rate of at least said first fluid material, downstream of the means for providing the supply of the first and second materials, at a first flow rate during the dispensing of the mixture and in response to the control signal, maintaining the flow rate of the first material at a second flow rate.

11. The system of claim 10 including a means to generate a control signal responsive to a driving signal.

12. The system of claim 10 further including a means for determining at least the amount of the first material supplied to the dispenser; and a means for adjusting the control signal in accordance with at least the amount of the first fluid material supplied to the dispenser and a desired amount of material to be dispensed.

13. The system of claim 9 wherein the dispenser is adapted for attachment to an end of an arm of a robot; and wherein the means for supplying the first and second materials and the means for controlling the flow rate are adapted for attachment at a location in proximity to the robot arm.

14. The system of claim 9 wherein said means for providing a supply of said first and second materials in a fixed ratio comprises the apparatus of claim 8.

15. An apparatus for dispensing viscous fluid materials comprising:

a first fluid chamber, adapted for receiving a source of a pressurized first fluid material, and having a first piston disposed within the chamber and mounted for reciprocal movement therein between a fill position and a dispense position;

a second fluid chamber separate and spaced apart from the first chamber and adapted for receiving a source of a pressurized second fluid material and having a second piston disposed within the chamber and mounted for reciprocal movement therein between a fill position and a dispense position, wherein the reciprocal movement of the first piston is in axial alignment with the reciprocal movement of the second piston and wherein the first and second pistons are independently moved into the fill position by pressure from the respective first and second fluid materials;

pressure means to exert axial force against the ends of the first and second pistons which are opposite to the ends which lie within the first and second fluid chambers to simultaneously move both pistons from the fill position to the dispense position; and a means for coupling the first and second pistons during dispensing such as to maintain a fixed ratio of material dispensed from each chamber and for decoupling the pistons from one another during refilling.

16. The apparatus of claim 15 wherein each piston extends from the respective fluid chamber.

17. The apparatus of claim 15 further including a piston rod extending through an axial hole through the second piston and engaging the first piston, said piston rod and second piston adapted to simultaneously receive force from the pressure means to move both the first and second pistons to the dispense position.

18. The apparatus of claim 15 further including a means, coupled to one of said chambers, for performing at least one of the following:

a) adjusting the flow rate of the fluids; and b) compensating of viscosity changes of the fluids.

* * * * *